United States Patent [19]

Seltmann et al.

[11] Patent Number: 4,897,029

[45] Date of Patent: Jan. 30, 1990

[54] DEVICE FOR PREPARING A VERY HOMOGENEOUS AND FINELY DIVIDED FINE-CERAMICS MASS

[75] Inventors: Dieter Seltmann, Schirnding; Emil-Karl Köhler, Berchtesgadeu-Oberau, both of Fed. Rep. of Germany

[73] Assignee: Porzellanfabrik Schirnding AG, Schirnding, Fed. Rep. of Germany

[21] Appl. No.: 179,563

[22] Filed: Apr. 8, 1988

Related U.S. Application Data

[62] Division of Ser. No. 58,795, Jun. 5, 1987, abandoned.

[30] Foreign Application Priority Data

Jun. 7, 1986 [DE] Fed. Rep. of Germany ....... 3619272

[51] Int. Cl.[4] .......................... B29C 67/02; B01J 2/06

[52] U.S. Cl. ................................ 425/222; 23/313 R; 23/313 FB; 264/115; 264/117; 264/128

[58] Field of Search ................. 264/117, 115, 123, 86, 264/12, 128; 23/313 R, 313 FB, 313 P, 313 HS; 425/200, 222, 223

[56] References Cited

U.S. PATENT DOCUMENTS

| | | | |
|---|---|---|---|
| 3,077,439 | 2/1963 | Shea, Jr. et al. | 264/115 |
| 3,143,428 | 8/1964 | Reimers et al. | 425/222 |
| 3,636,188 | 2/1972 | Driscoll | 425/222 |
| 3,981,659 | 9/1976 | Myers | 425/222 |
| 4,050,871 | 9/1977 | Kleeberg et al. | 425/222 |
| 4,315,879 | 2/1982 | Pfuhl et al. | 264/117 |
| 4,508,666 | 4/1985 | Pietzarka et al. | 264/12 |

FOREIGN PATENT DOCUMENTS

| | | |
|---|---|---|
| 53-76168 | 7/1978 | Japan . |
| 59-59239 | 4/1984 | Japan . |
| 60-179130 | 9/1985 | Japan . |
| 1318279 | 6/1987 | U.S.S.R. . |

*Primary Examiner*—Jay H. Woo
*Assistant Examiner*—K. P. Nguyen
*Attorney, Agent, or Firm*—Max Fogiel

[57] ABSTRACT

A device for preparing a very homogeneous and finely divided fine-ceramics mass from ceramic raw materials, liquids, aggregates, and similar materials, whereby the starting materials are finely ground, and liquid is added and later partly removed. The starting materials are ground dry or moist and all or some of the starting materials are first allowed to fall free in and through an upright container while being contacted with all or some of the liquid, which is injected in subject to turbulence, and then agglomerated into a granulate.

11 Claims, 1 Drawing Sheet

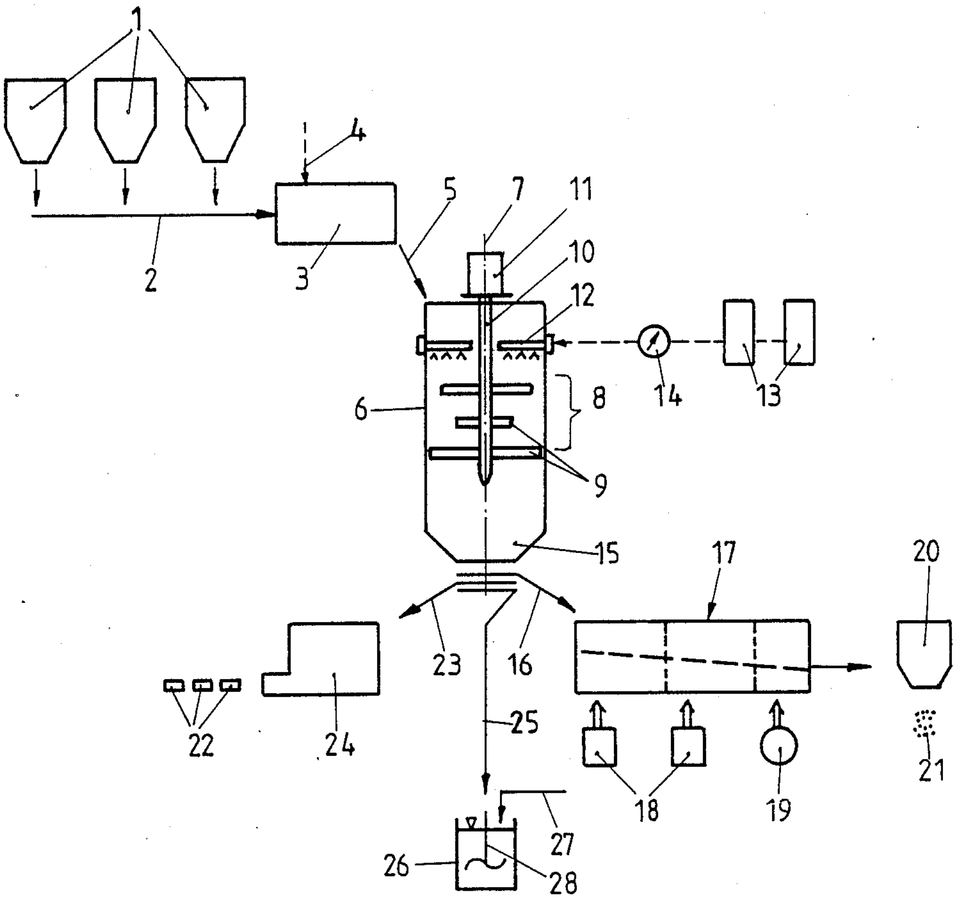
1
4
2
3
5
7
11
10
12
14
13
6
8
9
15
17
20
23
16
22
24
25
18
19
21
26
27
28

DEVICE FOR PREPARING A VERY HOMOGENEOUS AND FINELY DIVIDED FINE-CERAMICS MASS

This is a division of application Ser. No. 058,795 filed June 5, 1987 now abandoned.

The invention concerns a method of preparing a very homogeneous and finely divided fine-ceramics mass from ceramic raw materials, liquids, aggregates, and similar materials, whereby the starting materials are finely ground, and liquid is added and later partly removed. In the fine-ceramics industry, especially in the production of porcelain, crockery, etc., the quality of the fine-ceramics products depends, in addition to shaping, drying, and firing processes, on the chemical analysis, the minerological structure, the granule-size distribution, the homogeneity, and the fineness of the fine-ceramics masses employed. The processing of the masses that satisfy these demands is accordingly very significant. The starting materials, the especially hard materials that is, specifically the raw materials and aggregates are ground fine enough to pass through a screen with a mesh size of 10,000 per $cm^3$.

Two methods of producing or preparing fine-ceramics masses have previously been employed in the fine-ceramics industry, depending of course on what raw materials, aggregates, and liquids are employed, one resulting in pugs, cylindrical shapes of appropriate diameter and length and in a kneadable state, and the other in pourable or flowing granulates that are further processed in a dry press.

To produce the pugs some of the starting materials (the mechanically resistant) are ground wet in Alsing cylinders to the requisite fineness. Alsing cylinders are mills that rotate around a horizontal axis and are clad with resistant materials. The mechanically resistant materials are introduced into the cylinders with liquid, especially water, and grinding aids, and the mills are rotated 12 hours for example until the desired fineness is attained. The other starting materials (plastic) are usually prepared wet by the supplier and delivered dry. The plastic materials are placed in suspension in a blunger with for example 50 to 70% water, to which the suspension of liquified and ground mechanically resistant materials is added. The mechanically resistant and plastic materials are then thoroughly blunged or mixed together to homogenize them. The resulting mass is then screened in a known way in the liquid phase to separate oversized particles. Further processing for the purposes of purification, to remove magnetizable components for example, can also occur at this or a later stage. Finally, however, the jointly blunged suspension of mechanically resistant and plastic materials is pumped into a filter press and extruded into filter cakes of a kneadable and doughy consistency. The cakes are transferred to a vacuum pug mill, in which the air is removed from the mass, which is then extruded out. The billet is trimmed to obtain the desired pugs. The process must of course be carried out such that the pugs will be appropriate for further processing. The moisture content, homogeneity, and fineness in particular must be correct.

The drawback to this known method of producing pugs is that it is very machinery intensive and can be optimized only to a limited extent. The flow of material is comparatively poor, involving many processing steps and accordingly significant investment. Since this method proceeds, like all of the processes known to the fine-ceramics industry, through the liquid phase, a high percentage of liquid must be unreasonably added to the more or less moist masses to allow them to be liquid processed, and the considerable amount of liquid must be removed later to provide the appropriate level of moisture for a kneadable and doughy mass. The resulting pugs are appropriate in the porcelain industry only for plastic shaping, and it is impossible to press them into porcelain blanks. This again entails the use of the known plaster molds in the manufacture of porcelain, and the molds alone take up a considerable amount of space. About 50% of the mass employed must be returned to circulation and accordingly must be processed twice.

The other known process, which leads to a pourable or flowing granulate, is similar to the process for preparing pugs up to the stage of blunging the suspension of mechanically resistant and plastic materials, although comparatively less water is employed. The resulting slip is spray dried by being forced under high pressure through nozzles into a spray tower, which it travels through in free fall from top to bottom. Hot gas that can have a temperature of 400° to 600° C. is conveyed through the spray tower from the bottom to the top, in the opposite direction that is. The spray drying must be carried out such that the droplets of slip, vaporized into a mist, can coagulate as they fall through the tower into more or less spherical particles of granulate of a size appropriate for the particular application and with a moisture content of approximately 2 to 5% when they are removed. The pourable granulate must behave more or less like a liquid, flow uniformly between the fingers say, even though it actually consists of solid particles. The consistency is important for the manufacture of fine-ceramics products, especially of porcelain, by a dry-press method, especially isostatic compression.

The main drawback to producing the fine-ceramics material in the form of a pourable granulate is that it consumes a lot of energy in spray drying. The process is also expensive in terms of machinery. Another drawback is dictated by the shape of the particles of granulate. Spray drying produces hollow particles, meaning that the individual spherules of granulate, which are in turn composed of a number of extremely fine particles of the mass, are hollow on the inside, more or less like a thick-walled ball, and, although the granules can be compressed, they will to a certain extent regain their original shape to the detriment of the smoothness and evenness of the surfaces of the final fine-ceramics product.

Both of these methods can of course be slightly varied and modified. They do represent, however, the only two basic ways of arriving at practicable fine-ceramics masses. In all of the production and processing methods now employed it is necessary to take the in itself dry starting materials through the liquid phase, to interpose a suspension in other words, and then remove the liquid again by drying and other procedures in order to obtain a fine-ceramics mass with a desired moisture level ranging from approximately 2 to 15%. Although it might seem irrational to employ such an excess of water during the liquid phase when the mass is to contain much less moisture eventually, those of skill in the art are aware that it is only the liquid phase that can ensure the requisite fineness and homogeneity.

The object of the invention is accordingly a method and a device that can be employed to obtain a mass appropriate for fine-ceramics purposes essentially less expensively than previously. It is especially important to avoid a liquid phase. It will on the one hand now be possible to obtain a fine-ceramics mass in the form of a pourable granulate particularly appropriate for isostatic pressing. Further steps in the process will also allow plastic pugs and even casting slips to be obtained.

This object is attained in accordance with the invention in a method of the type initially described in that the starting materials are ground dry or moist ad all or some of the starting materials are first allowed to fall free in and through an upright container while being contacted with all or some of the liquid, which is injected in subject to turbulence, and then agglomerated into a granulate. It is accordingly important that the starting materials are no longer ground wet, but dry or at any rate moist, whereby the amount of liquid employed corresponds to the final moisture content of the granulate or fine-ceramics mass.

The finely ground starting materials are turbulently agitated during their free fall while more or less thoroughly or partly mixed. The turbulence can be initiated by a rapidly operating mixer, with the path of the individual particles of starting materials being forced into a circle or helix. In this state they are briefly contacted with all or some of the liquid, in the from of a mist that is, which can contain an electrolyte. The amount of liquid supplied also depends on arrival at a point of agglomeration, when, that is, the particles grow into granulated particles. It may happen accordingly that somewhat more liquid is introduced than the desired moisture content of the granulate as required for further processing, in which case a drying stage will be introduced downstream. The amount of liquid employed, however, is in no way comparable to what occurs when the mass passes through a liquid phase in accordance with the state of the art. The considerably more economical approach to the processing will accordingly be obvious in that wet grinding, obtaining a suspension, and even the use of a filter press or spray tower are eliminated. Since the number of processing steps is reduced, the method will also be more cost effective and rapid on the whole. Less energy will be consumed and the process will be extensively optimalized. Another advantage is that ceramic raw materials that have previously been impracticable or unpractical can now be employed. Injecting liquids or even suspensions into the container and contacting them with the linearly traveling starting materials therein will result in especially thorough homogenization, making the uneconomical processing through a liquid phase redundant. This result, so surprising to one of skill in the art, is simultaneously the essential advantage of the new method. Another advantage is that, in contrast to spray drying, which must involve electrolytes, the present method can be carried out without any chemical additives. It is of course always possible when practical to employ any additive, injected along with the liquids and accordingly added to the mass while it agglomerates, to provide the ceramic mass or the products manufactured therefrom with special properties. The ceramic mass in the from of a granulate is appropriate for any size blank or casting. There is accordingly no longer any dependence on the diameter of the pug. The granulate is especially appropriate for the isostatic pressing of shapes for the porcelain industry, specifically because the agglomeration results in a solid granule, in contrast to the hollow granules derived from spray drying. A solid granule will result in a smoother surface, especially with isostatic pressing. It has also turned out that, since the fine-ceramics products will be more stable when fired, the processing will in the last analysis lead for example to dinner plates or cups with thinner walls, providing new potentials for design. Obviously the resulting granulate is naturally not and cannot be a powder even though the individual granules are very small. A powder would not exhibit the requisite pourability and flow and could therefore not be further processed in the same way.

It is especially practical when the starting materials are ground in a pulverizer, preferably an impact pulverizer, to obtain a splintering granule. The wet grinding at the state of the art produces a more or less round granule with a spherical surface. An impact pulverizer on the other hand will produce a splintering granule with a surface composed of several mutually displaced areas. A splintering granule will grow more readily when the granulate agglomerates and the mass will be more cohesive, especially in a dry-pressed ceramic shape. This may be ascribable to the splintering granule breaking down and bonding more readily in dry pressing than a hollow and spherical granule, another way of explaining the fine-ceramics products' comparatively greater smoothness and increased strength.

It is a special advantage when all the starting materials are mixed together first and then ground up jointly, resulting in complete intermixture and homogenization of all the starting materials required in a particular formulation even at this initial step of the process. It can, however, also be necessary to treat some or all of the starting materials separately, to pulverize and/or agglomerate them individually that is, and then combine them together in the correct proportions at a later stage of processing.

When the starting materials mass is intended to be a granulate, it is usually necessary to add slightly more liquid to promote creation of the granulate than what is added to a fine-ceramics mass that is in the desired condition for further processing. It will then be necessary for the agglomerated granulate to be dried, which can be done especially effectively by means of a fluidized-bed method, to avoid any abrasion and destruction of the shape of the granules. A flying-current or turbulence-bed process, however, can also be employed for the purpose.

If on the other hand the fine-ceramics mass is eventually to be processed into pugs, to turn out porcelain products on a lathe for example, the drying stage can be eliminated, and the agglomerated granulate deaerated and plasticized in a vacuum pug mill and extruded into pugs. Since the moisture content necessary for agglomeration essentially equals that necessary for turning, a drying stage can be conveniently left out at this point. This, however, does not exclude the necessity of subjecting the turned porcelain shapes to a drying process, although shapes pressed dry from the granulate will not have to be dried.

Additives that in particular have a compacting action can also be introduced into the liquids or suspensions being injected. The method allows them to be added at any time without any problem once the starting materials have been homogenized.

The finely ground starting materials can in particular be provided with a helical tumbling motion by means of a rapidly operating mixer in the container, and all or some of the liquid can be sprayed in under pressure in the form of a mist, whereby the speed of the mixer is adjusted to the amount of liquid such that the starting materials and the liquid will agglomerate into a pourable granulate. The starting materials or batch will be thoroughly mixed and agglomerated at practically the same time. The resulting granulates or the granulates obtained by downstream drying will be extremely homogeneous and pourable and flowing enough to satisfy the strictest technical demands, especially in relation to allowing rapid pressing cycles.

The agglomerated granulate can have liquid added to it and be further processed into a casting slip. This is done by means of a blunger and mixing trough. Additives like liquifiers can be added in addition to the water.

The device for carrying out the method has a mill for pulverizing the starting materials and is characterized by an upright container with a feed for the dry- or moist-ground starting materials opening into its top and accommodating pipes with nozzle-like openings for vaporizing liquids and, below the pipes, a rapid-acting mixer with arms. The arms, which turn very rapidly, transform the already pulverized starting materials into a turbulent cloud of dust that comes into brief contact with the liquid and accordingly agglomerates.

A drier, in which the moisture and temperature of the granulate can be acted on can be positioned downstream of the container. This will be done when the granulate is to be employed in a pourable form for dry-pressing fine-ceramics products. The drier can be a flowing-bed or flight-current drier, in which case it will be practical to provide a cooling station at the end to prevent separation of liquid that might lead to caking up of the granules and impede pourablility.

It will be practical for the mixer to have adjustable arms and for its shaft to have an adjustable or variable speed so that an appropriate choice of angle for the arms can be employed to vary the dwell time of the particles of starting materials.

The invention will now be described and specified with reference to the flow chart, which is a schematic representation of the method and of the various components of the device.

Ceramic raw materials and aggregates, specifically mechanically resistant and plastic materials, are withdrawn from several silos 1 in the proportions necessary for a particular application and supplied by means of a conveyor 2 to an impact or other type of pulverizer 3. Liquid, especially water, is supplied through a line 4 to moisten the starting materials as necessary. No wet grinding in particular occurs, and the grinding in impact pulverizer 3 is dry or moist, resulting in a splintering granule of the requisite fineness. The batch is simultaneously already homogenized. A feed 5 supplies the pulverized starting materials down into a container 6 with an upright axis 7. The materials are distributed throughout the top of the container by a distributing mechanism and fall free through part of the container. A mixer 8 with mixing arms 9 is accommodated along container 6 inside container 6. The shaft 10 of mixer 8 is rapidly driven by a motor 11 that is mounted in a practical way at the top. The speed of shaft 10 can range from 2500 to 6000 rpm. The speed is variable and can be adapted to the particular application. Arms 9 can also be adjusted. They can consist of vanes with an adjustable angle and can vary in number as well. Mixer 8 initiates with its arms 9 a turbulent motion on the part of the freely falling starting materials, whereby they are also uniformly distributed into the form of a cloud of dust as they come into contact with the arms. Above mixer 8 are spray pipes 12 with nozzle-like openings through which liquids or additives—also in the form of suspensions—can be injected from reservoirs 13 under appropriate pressure by means of a pump 14. The liquid is also distributed into a mist and comes into intimate contact with the turbulent starting materials, resulting in an agglomeration. The adhesion of the individual granules of starting materials to one another and their caking together result in a fine granulate consisting of individual solid spherules. The granulate drops down inside container 6 and arrives in the vicinity of an exit 15, where conveyors carry it away. The liquid misted into container 6 from reservoirs 13 corresponds in amount and composition to the desired moisture content of the granulate to be further processed in the form of a ceramic mass. The moisture content must also be appropriate for agglomeration and can accordingly be somewhat h-higher than that of a pourable granulate that is to be employed for dry pressing into porcelain or similar, products. For this purpose the granulate at container exit 15 is supplied by conveyors 16 to a fluidized-bed drier 17 that is in a practical way divided into several processing compartments. Since the primary function of the drier is drying, it is provided with heaters 18, which can for example be hot-gas generators. Fluidized-bed drier 17 is, however, also employed for cooling, and its last chamber can accordingly be reasonably provided with a cooler in the form for example of a fan 19. Since fluidized-bed driers are in themselves known, this component of the device does not require specification. The pourable and flowing material finally arrives from fluidized-bed drier 17 with a desired moisture content of approximately 2 to 5% in a reservoir 20, from which granulate 21 can be extracted as needed. Granulate 21 is especially practical for isostatic dry pressing of ceramic products.

If on the other hand the object is to produce pugs 22 for turning fine-ceramics products, the drying stage is eliminated because pugs generally have a higher moisture content. The granulate in this case leaves exit 15 and is transported by conveyors 23 to a vacuum pug mill 24, in which it is deaerated, compacted and extruded in billets through a die. The billets are trimmed into individual pugs 22.

A third variation of the method is the potential for producing a casting slip. For this purpose the granulate leaves exit 15 and is transported by a conveyor 25 into a mixing trough 26, to which water and if necessary other liquids and/or liquifiers are added in the direction indicated by arrow 27 and in which the ceramic slip is produced. A blunger 28 operates in mixing trough 26 and homogenizes the suspension.

Three different batch recipes will now be specified, one for a dry-press granulate 21, one for pugs 22, and one for a

| 1. Recipe for a batch of dry-press granulate | |
|---|---|
| Eurite | 30.0% |
| Kaolin DH 1 | 21.0% |
| Kaolin DK 1 | 15.0% |
| Kaolin KK 1 | 20.0% |
| Quartz | 11.5% |
| Feldspar | 2.5% |
| | 100.0% |
| Clay substance | 50.06% |
| Quartz | 30.00% |

-continued

| 1. Recipe for a batch of dry-press granulate | |
|---|---|
| Feldspar | 19.94% |
| | 100.00% |

The above starting materials are ground dry together in a pulverizer to a granule size of less than 60μ. In this already mixed form they are supplied by feed 5 to container 6. A suspension of water and a ceramic compacter, illite for example, is injected through spray pipes 12. The amount of liquid employed is slightly more than the desired moisture content of the dry-press granulate, although the illustrated moisture content in the mixer is necessary to ensure agglomeration. The granulate at the exit 15 from container 6 arrives in the fluidized-bed drier, in which it is dried and cooled until the granulate 21 finally arriving in reservoir 20 has the desired moisture content of for example 2%. Otherwise unusable kaolins are employed in this example. Eurite is a rock kaolin that cannot be used in a plastic process. Kaolin DH 1 is also hardly practical for making porcelain in that it has a poor raw breaking strength. DK 1 and KK 1 are paper-making kaolins that are also inappropriate for making kaolin due to their poor raw breaking strength. These materials can, however, be employed in accordance with the new method with additives to increase their raw breaking strength.

| 2. Recipe for a batch employed for pugs | |
|---|---|
| Pegmatite | 30–40% |
| Feldspar | 3–8% |
| Kaolin 1 | 8–12% |
| Kaolin 2 | 15–20% |
| Kaolin 3 | 8–12% |
| Kaolin 4 | 3–8% |
| Illite | 3–8% |
| Ball clay | 1–4% |
| Glow bodies | 3–8% |

The starting materials are ground moist with a maximum moisture content of 10%. Both pulverized groups of starting materials are introduced into container 6 together by means of feed 5, with liquid in the form of a suspension of water and plasticizers added to an overall moisture content of approximately 18%. This is the final and desired moisture content for the pugs. The granulate at exit 15 is put through vacuum pug mill 24 to produce pugs 22.

| 3. Recipe for a batch employed for slip | |
|---|---|
| Zettlitz kaolin | 30.5% |
| Spanish 201 kaolin | 15.0% |
| Meka kaolin | 10.0% |
| Feldspar | 21.0% |
| Quartz | 23.5% |
| | 100.0% |
| Clay substance | 49.64% |
| Quartz | 29.07% |
| Feldspar | 21.29% |
| | 100.00% |

The recipe for a conventional casting slip and its rational analysis differ from those for granulate essentially in the kaolin. The kaolins employed in the slip are characterized in that high liquification can be attained with only a little electrolyte, providing the slip with the maximum possible liter weight, so that the plaster molds employed in the subsequent casting of the products will not become saturated with water too rapidly and allowing rapid and powerful body formation.

The starting materials are processed in two groups. Feldspar and quartz are pulverized in an Alsing cylinder, screened, and mixed with the second component, kaolin, into a finished batch in a blunger.

We claim:

1. An arrangement for preparing a very homogeneous and finely-divided fine-ceramics mass from ceramic raw materials, liquids, aggregates, and similar materials, usable for dishes and articles in isostatic pressing comprising: means for finely grinding starting materials to form a granulate having processing properties for producing porcelain; means for adding liquid to the ground materials; an upright container with a feed for the ground starting materials entering through the top of the container; pipes on said container with nozzle-shaped openings from which the liquid emerges as a mist; a rapid-acting mixer with arms below said pipes; said starting materials being first allowed to fall freely through said upright container while being contacted with liquid injected under turbulence and then agglomerated into a granulate; and means for partly removing the liquid; said granulate having a predetermined kernel construction with individual splintering particles in form of a grape in which kernels are put together; said granulate containing air and being compressible, said air escaping from said granulate when said granulate is compressed.

2. An arrangement for producing a homogeneous ceramic mass from ceramic raw materials, liquids, aggregates, and similar materials, usable for dishes and articles in isostatic pressing comprising: means for grinding finely-set starting materials dry or moist; mixer means in a container for applying a staggering turbulent motion to said starting materials; means for adding liquid to agglomerate said starting materials and said liquid into an agglomerated granulate, said starting materials having a homogeneity and a fine grinding for producing porcelain, stoneware, and similar materials, said starting materials being ground dry or moist so that they can pass a screen with 10,000 mesh; means for guiding at least some starting materials in a vertical container from top of said container in free fall; mixing arms in said container and being driven at a rotational speed between 2,500 and 6,000 revolutions per minute; said mixing arms producing a turbulent air stream for applying to said starting materials with said liquid a helical turbulent motion for obtaining agglomeration.

3. An arrangement as defined in claim 1, including drier means positioned downstream of said container for acting on moisture and temperature of said granulate.

4. An arrangement as defined in claim 3, wherein said arms of said mixer are adjustable; said mixer having a shaft with adjustable or variable speed.

5. An arrangement as defined in claim 2, including an impact pulverizer for grinding said starting materials to obtain a splintering granule.

6. An arrangement as defined in claim 2, wherein all starting materials are at first mixed together and then ground up jointly.

7. An arrangement as defined in claim 2, including fluidized-bed means for drying said agglomerated granulate.

8. An arrangement as defined in claim 2, including a vacuum pug mill for deaerating and plasticizing the agglomerated granule and extruding into pugs.

9. An arrangement as defined in claim 2, wherein additives having a compacting action are introduced along with said liquid.

10. An arrangement as defined in claim 2, including a rapidly operating mixer in said container for applying a helical tumbling motion to said finely ground starting materials, at least some of said liquid being sprayed in under pressure in form of a mist, said mixer having an adjustable speed related to the amount of liquid so that said starting materials and said liquid agglomerate into a pourable granulate.

11. An arrangement as defined in claim 2, wherein liquid is added to the agglomerated granulate; and means for processing said agglomerated granulate into a casting slip.

* * * * *